(12) United States Patent
Prajapati et al.

(10) Patent No.: US 10,857,532 B2
(45) Date of Patent: Dec. 8, 2020

(54) SLURRY PHASE ORGANIC-INORGANIC FUSED HYBRID CATALYST FOR RESIDUE HYDROPROCESSING AND PROCESS FOR PREPARATION THEREOF

(71) Applicant: COUNCIL OF SCIENTIFIC & INDUSTRIAL RESEARCH, New Delhi (IN)

(72) Inventors: Ravindra Prajapati, Dehradun (IN); Kirtika Kohli, Dehradun (IN); Samir Kumar Maity, Dehradun (IN); Madhukar Onkarnath Garg, Dehradun (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 248 days.

(21) Appl. No.: 15/085,661

(22) Filed: Mar. 30, 2016

(65) Prior Publication Data

US 2016/0288101 A1    Oct. 6, 2016

(30) Foreign Application Priority Data

Mar. 30, 2015 (IN) .......................... 0872/DEL/2015

(51) Int. Cl.
| | |
|---|---|
| *B01J 37/04* | (2006.01) |
| *C10G 29/04* | (2006.01) |
| *B01J 23/652* | (2006.01) |
| *C10G 45/10* | (2006.01) |
| *B01J 31/34* | (2006.01) |
| *C10G 45/08* | (2006.01) |
| *B01J 37/00* | (2006.01) |
| *C10G 47/26* | (2006.01) |
| *B01J 23/85* | (2006.01) |
| *B01J 23/883* | (2006.01) |
| *B01J 31/02* | (2006.01) |
| *B01J 31/04* | (2006.01) |

(52) U.S. Cl.
CPC ............... *B01J 37/04* (2013.01); *B01J 31/34* (2013.01); *B01J 37/0081* (2013.01); *C10G 45/08* (2013.01); *C10G 47/26* (2013.01); *B01J 23/85* (2013.01); *B01J 23/883* (2013.01); *B01J 31/0202* (2013.01); *B01J 31/04* (2013.01)

(58) Field of Classification Search
CPC ..................................................... B01J 23/652
See application file for complete search history.

(56) References Cited

U.S. PATENT DOCUMENTS

| | | | | |
|---|---|---|---|---|
| 4,134,825 A | | 1/1979 | Bearden, Jr. et al. | ........ 208/108 |
| 4,194,967 A | | 3/1980 | Gatsis | ........... 208/215 |
| 4,226,742 A | | 10/1980 | Bearden, Jr. et al. | ........ 502/170 |
| 4,637,870 A | | 1/1987 | Bearden, Jr. et al. | ........ 208/112 |
| 4,637,871 A | | 1/1987 | Bearden, Jr. et al. | ........ 208/112 |
| 5,147,841 A | | 9/1992 | Wilcoxon | ...... 502/173 |
| 2013/0031544 A1 | | 1/2013 | Sridharan et al. | ................ 718/1 |
| 2014/0374314 A1 | * | 12/2014 | Sundararaman | ....... C10G 49/06 208/78 |
| 2015/0014216 A1 | * | 1/2015 | Sundararaman | ..... B01J 23/8906 208/49 |
| 2015/0306578 A1 | * | 10/2015 | Jia | ............................ B01J 23/85 502/220 |

\* cited by examiner

*Primary Examiner* — Douglas B Call
(74) *Attorney, Agent, or Firm* — Norton Rose Fulbright US LLP

(57) ABSTRACT

Oil soluble organic-inorganic fused slurry phase hydroprocessing catalysts for heavy oils and residues are prepared at supercritical conditions. The hydrodemetallization, hydrodesulfurization, asphaltene conversion and hydrocracking activities of a residue having high percentage of metals, sulfur and asphaltene have been tested in an autoclave batch reactor. The different organic compounds are used to modify the solid fused material (catalyst). The effect of the concentration of modifier on the hydroprocessing and hydrocracking reactions has also been investigated.

9 Claims, 3 Drawing Sheets

SLURRY PHASE ORGANIC-INORGANIC FUSED HYBRID CATALYST FOR RESIDUE HYDROPROCESSING AND PROCESS FOR PREPARATION THEREOF

CROSS-REFERENCE TO RELATED APPLICATIONS

This application claims priority to Indian Patent Application No. 0872/DEL/2015 filed Mar. 30, 2015, the entire contents of which are incorporated herein by reference without disclaimer.

FIELD OF THE INVENTION

The present invention relates to a slurry phase organic-inorganic fused hybrid catalyst and the process for preparation thereof. Particularly the present invention relates to slurry phase organic-inorganic fused hybrid catalyst having high solubility in reaction media, high activity for hydrodemetallization (HDM), high activity of hydrodesulfurization and high conversion of residue.

More particularly the present invention relates to a slurry phase organic-inorganic fused hybrid catalyst useful for slurry phase hydroprocessing of heavy crude oils or residues.

BACKGROUND OF THE INVENTION

There is a drastic increasing demand of high value lighter products, more particularly middle distillates for transportation fuels and at the same time the demand of residue is decreasing. Now at the present scenario, the new refinery is coming up with almost near to zero residues. And therefore, the residue utilization is becoming very important and challenging task for the refinery. Residue contains the maximum amount of contaminates like sulfur, nitrogen, metals and asphaltenes. Due to the presence of very high concentration of metals and asphaltenes, the downstream process is very problematic to handle highly viscous residues. The catalysts used in downstream processes deactivate very fast. To cope up the demand and supply gap of the lighter products, residue is upgraded in the refinery by two routes. One route is carbon rejection processes like, delayed coking, visbreaking, solvent deasphaltene and another route is hydrogen addition process that mainly includes hydroprocessing. Among these two routes, hydrogen addition is very attractive way to upgrade residue since it gives more valuable products.

The catalysts used in residue fluid catalytic cracking or in hydrocracking are deactivated very rapidly when the feed contains a very high percentage of asphaltene. For both processes, there is a certain limit of asphaltene and beyond that process cannot run smoothly. The presence of a high percentage of asphaltene is the primary cause of catalyst deactivation. It is the main precursor of coke. Deactivation of hydroprocessing catalysts is found on time-on-stream. Activity changes rapidly during the first a few hours of run and then it becomes stable. It is observed that coke equivalent to up to 20-25 wt % of the original catalyst is deposited within a few hours of run and it decreases surface area more than a half. Loss of surface area is occurred due to blockage of small pore of the catalyst.

Residues mainly contain a high percentage of vanadium and nickel and some cases iron depending on the sources. The presence of these metals causes poisoning of the catalysts during hydroprocessing reactions. The metals are normally distributed between porphyrin and nonpophyrin types of constructions. These metals containing compounds are deposited into the catalyst during hydrotreating. Because of their large size they do not penetrate deeply into the catalyst. They are accumulated as metal sulfides into the pore mouth of the catalyst and block the way to enter the reactants. This is cause for deactivation of catalyst.

To solve the problem of rapid catalyst deactivation, various types of reactor system like fixed bed, moving bed, ebullated bed and slurry bed reactors are in use for hydroprocessing of heavy crude oils and residues. The catalyst life of fixed bed catalysts is very short, even its activity cannot sustain more than one year. Similarly ebullated bed reactor has its disadvantage to process very high contaminant feeds stocks. The formation of sediment at the higher conversion level and high operating cost of this ebullated bed reactors are major disadvantages of this process. Moreover, the nature of crude oils is changing. It also makes these processes very problematic to refine. This can be resolved by using slurry bed reactor. It is a very much robust process and it can handle very high contaminant feeds. In this process a small amount of catalyst is mixed with feed and the mixture is sent to the reactor chamber where the hydrocracking conversion occurs at elevated temperature. The main purpose of the catalyst here is inhibition of coke formation during thermal cracking of residual molecules into the lighter fractions. The major advantages for the use of slurry bed reactors are:

- The process can be used for very high metals, sulfur and asphaltenes content feedstock.
- Comparatively low cost materials can be utilized for preparation of catalysts or additives.
- Coke formation is relatively low and hence through put of the reactor is high.
- Very high conversion can be achievable.

Several materials are employed for slurry bed catalysts, catalyst precursors or additives. Among them iron compounds are used most often. Groups VIE and VIIB compounds are also reported for slurry bed catalysts. The finely powder catalysts (or additives) are dispersed into the oil. In CANMET process ferric sulfate is used as additive, whereas iron oxide and/or a partially gasified lignite char are found to be an effective additive for VEBA process. Toyo Engineering Corporation has proposed a very active carbon supported iron sulfide catalyst for hydroprocessing of Maya crude. INTEVEP, Venezuela used natural ore for hydrocracking of the Venezuelan heavy crude oils. Whereas, in EST process, very high activity of dispersed molybdenum sulfide is employed. Molybdenum, cobalt, iron and nickel naphthanates, and iron pentacarbonyl are some of the examples of oil soluble catalysts which are used in slurry bed hydroprocessing catalyst for upgradation of heavy oils or residues. In the old days, mainly water soluble iron catalysts were used. However, the use of other catalysts like very fine catalyst powder and oil soluble catalysts is becoming more attractive. The use of these materials has great advantages compared with the water soluble catalysts. It is reported that dispersed or oil soluble catalysts can effectively contact with residue molecules which facilitates cracking.

U.S. Pat. Nos. 4,134,825 and 4,226,742 disclose a process to upgrade heavy hydrocarbon by an oil soluble catalyst containing 10-950 wppm of active metal such as molybdenum. The main objective of this invention is to reduce CCR level at least 50% of the original value. To convert the oil soluble metal compound to a catalyst, the metal compound is sulfided in situ in the presence of $H_2/H_2S$.

U.S. Pat. No. 4,194,967 discloses a preparation method of vanadium sulfide catalyst for hydroprocessing of a feedstock having high percentage of asphaltenes and organo-metallic compounds. The catalyst is a colloidal suspension in the hydrocarbon. The reaction is studied 4 to 8 hours in an autoclave batch reactor in 200 ATM pressure of hydrogen and 750° F. temperature.

U.S. Pat. Nos. 4,637,870 and 4,637,871 disclose a process to convert oil, coal or a mixture of both into a lighter hydrocarbon by applying an aqueous solution of phosphomolybdic acid and phosphoric acid at a preferred ratio as a catalyst. The catalyst is sulfided using a mixture of $H_2/H_2S$ prior to use for hydrocarbon conversion. The final solid catalyst contains molybdenum and phosphorus and the atomic ratio of P/Mo in the final catalyst is in the range of 0.2:1 to 0.4:1.

U.S. Pat. No. 5,147,841 discloses a catalyst preparation method wherein it is said that metal colloidal particles or colloidal alloy particles are prepared by the inverse micelles method. In this invention, an inverse micelles solution is prepared by mixing a metal salt solution, surfactant and an organic solvent. The size and number of micelles can be controlled by changing the concentration of surfactant and organic solvent. Similarly, a colloidal alloy inverse micelles particle can be prepared by mixing another metal salt solution with the first metal solution in the presence of surfactant and organic solvent. Finally the organo metallic part is separated from the surfactant and dried to form a powder and can be used as catalyst.

US Pat no. 2013/031544 A1, discloses a catalyst preparation method for producing an organometallic catalyst. This method comprises a step by mixing of a polycarboxylic acid or anhydride and a metal oxide, metal hydroxide or metal salt with a solvent at high temperature and pressure. In this method solvent exists as a supercritical or near to critical fluid conditions.

OBJECTIVE OF THE INVENTION

The main objective of the present invention is to provide a slurry phase organic-inorganic fused hybrid catalyst and the process for preparation thereof.

Yet another objective of the present invention is to provide a slurry phase organic-inorganic fused hybrid catalyst having high solubility in reaction media, high activity for hydrodemetallization (HDM), high activity of hydrodesulfurization and high conversion of residue.

Still another objective of the present invention is to provide a slurry phase organic-inorganic fused hybrid catalyst useful for slurry phase hydroprocessing of heavy crude oils or residues.

SUMMARY OF THE INVENTION

Accordingly the present invents provides a slurry phase organic-inorganic fused hybrid catalyst comprising Inorganic part of metals from group VI B and VIII B in a ratio of 4:1 and an organic part.

In an embodiment of present invention, the metal from VIB is molybdenum and the metal from VIIIB is nickel in a ratio of 4:1 and the said catalyst is solid at room temperature and is thermally stable.

In another embodiment of present invention, the said catalyst is useful for hydroprocessing reaction selected from a group comprising of hydrodemetallization, hydrodesulfurization, asphaltene conversion and hydrocracking.

In yet another embodiment, the present invention provides a process for preparation of slurry phase organic-inorganic fused hybrid catalyst comprising the steps of:
a) mixing the aqueous solutions of ammonium hepta molybdate and hexahydrade nickel nitrate to obtain a mixture;
b) preheating the mixture of aqueous solutions of as obtained in step (a) with an organic modifier at a temperature in the range of 100-200° C. and at a pressure in the range of 75-150 kg/cm² for a period in the range of 10-30 minutes;
c) reacting the mixture as obtained in step (b) in an autoclave batch reactor at a temperature in the range of 300-400° C., at a pressure in the range of 150-300 kg/cm² for a period in range of 30-75 minutes to obtain a reaction mixture;
d) quenching the reaction mixture as obtained in step (c) at temperature in the range of 15-30° C. to obtain a bi-phase reaction mixture with an aqueous and organic phase;
e) separating the bi phase reaction mixture as obtained in step (d) by solvent extraction, followed by washing and drying to obtain an organo metallic catalyst.

In still another embodiment of present invention, the organic modifier of step (b) are added 1M-5M ratio with respect to Mo.

In yet another embodiment of present invention the organic modifier of step (b) is selected from oleic acid, palmitic acid, lauric acid, cyclo hexane carboxylic acid, hexadecanol and 2-methyl 1-hexanal.

In yet another embodiment, the present invention provides method for hydro processing of heavy oils and residues (feedstock) using the catalyst as claimed in claim 1 wherein the process steps comprising the steps of:
i. heating 100-500 gram of feedstock with 3-5 gram of catalyst in the reactor at a temperature in the range of 300-500° C., pressure in the range of 50-200 kg/cm² for a period in the range of 2-6 hrs followed by stirring in the presence of hydrogen in a slurry phase reactor and separating the desired product.

In still another embodiment of present invention, the hydroprocessing may take place with or without solvent, wherein the solvent is selected from decaline, diesel and light cyclic oil.

In still another embodiment of present invention, the residue employed as feedstock comprising high metals content >250 wppm; high sulfur content >5 wt %; high asphaltene content >15 wt %; and containing maximum 550° C. plus material not less than 90 wt %.

DETAILED DESCRIPTION OF THE INVENTION

The present invention provides for slurry phase organic-inorganic fused hybrid catalyst and process for preparation thereof which is useful for slurry phase hydroprocessing of heavy crude oils or residues The slurry phase hydroprocessing catalysts were prepared to process the vacuum residue. There are three kinds of catalysts are reported in the open literature. One is a water soluble catalyst, another one is dispersed catalyst and $3^{rd}$ one is oil soluble catalysts. It was also reported that the catalyst activities including hydrocarbon conversion depend on what kind of catalyst was used, i.e. whether it is water soluble, dispersed or oil soluble catalyst. It is found that the catalyst that is soluble in the hydrocarbon is generally much more effective than the other two types of catalysts. Therefore, the principal objective of this invention is to develop a methodology to prepare highly active oil soluble catalyst. Since the catalyst is oil soluble, it is easily mixed into the reactive hydrocarbon and gives very high hydrotreating conversion as well as hydrocracking activity.

Figure 1:
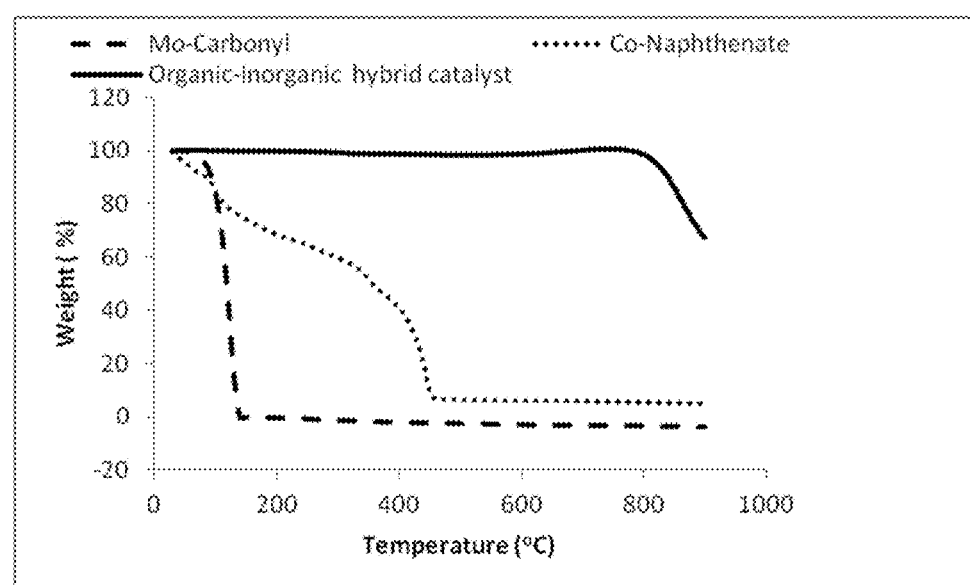
FIG. 1 depicts a TGA curve showing thermal stability of oil soluble and hybrid catalysts

The majority of hydrotreating catalyst contains metals from group VIB and VIIIB of the periodic table. The metals from group VIB is known as active metals and metals from VIIIB are known as a promoter. The main feature of the catalysts in this present invention is easily soluble in the hydrocarbon and it is vacuum residues in this case. The required amounts of VIB metal and VIIIB metals are taken and make two clear aqueous solutions. These two aqueous solutions are then mixed with organic compound. The mixture is then preheated at the required temperature and finally is treated at supercritical reaction conditions. In this condition the metals are fused into the organic compounds. Different kinds of organic compounds are used in this invention and these are hexanol, cylco-hexane, oleic acid, lauric acid, hexadecanol etc. Finally the organic phase which contains active metals is then separated from aqueous medium. The novelty of these catalysts is they have two parts-one is inorganic part and other is organic part. The inorganic part helps the catalyst for hydrogenation of cracked products during reaction and hence inhibits the coke formation. The other part which is organic in nature facilitates the catalyst to easily mix up into any hydrocarbon. In other word, the organic part acts as a surface modifier of the inorganic metal. During preparation conditions, both organic part and inorganic metals fuse together and form an organic-inorganic hybrid material which is solid in nature but easily soluble in any hydrocarbons or organic solvent. In general the oils soluble catalysts like, iron pentacarbonyl, metal naphthenates are decomposed into metal and organic components at high temperature. However, the catalyst prepared in this invention has great advantages like, it is solid at room temperature and thermally stable. There is also another advantage of this preparation method is that the surface of the inorganic part can be modified by any organic compounds like, hexanol, cylco-hexane, oleic acid, lauric acid, hexadecanol etc. The thermal stability of Oil soluble (Mo-carbonyl, Co-naphthenate) and hybrid (organic-inorganic fused material) is determined by thermogravimetic analysis and presented in FIG. 1. In this figure, the weight loss due to combustion is recorded against temperature.

The hydroprocessing reaction in this invention is carried out in a batch reactor employing suitable operating conditions using vacuum residue as feedstock which contains a high percentage of sulfur, metals, and asphaltene. Therefore, the present invention relates to the removal of metals, sulfur and asphaltene from residues. Specifically, the catalyst is prepared for the hydrodemetallization (HDM), hydrodesulfurization (HDS), asphaltene conversion (HDAsp) and hydrocracking of residue (HC). More specifically, the main objective of this invention is that the preparation of suitable hybrid catalyst for upgrading of vacuum residue, i.e. HDM, HDS, HDAsp and specially conversion of residue. In this purpose 1 L volume of high pressure and high temperature batch reactor was used to carry out catalytic activities. Suitable hydroprocessing conditions include temperature of 200-500° C., preferably 300-475° C. and the most preferably 350-450° C., a suitable pressure in the range of 100-200 kg/cm$^2$ was used. The reaction time for this residue conversion in the range of 2-10 hrs can be used. The required amount of feed and catalyst were taken into the reactor. The reactor system is closed properly and leak test was performed. The reactor was then purged three times with pure hydrogen. The reactor was then pressured the adequate hydrogen so that the pressure should reach to the desired pressure at the given reaction temperature. When the temperature reached to the reaction temperature, the feed and catalyst mixture was stirred at 750 rpm. The reaction was continued around 2-10 hrs. After reaction the liquid product was separated from solid product (coke) and sulfur, metals and its distillation of liquid product were analysed.

EXAMPLES

Following examples are given by way of illustration and therefore should not be construed to limit the scope of the invention.

Example 1

This particular embodiment comprises of supercritically prepared bimetallic hydrogenation catalysts and their activity of residue hydro processing in a slurry bed reactor is investigated. Most of these catalysts are present in their oxide form and hence it is difficult to make dispersion in hydrocarbon. In the present invention a new method was proposed for synthesis of organic-inorganic fused materials at supercritical conditions to sort out this problem. The catalyst for this particular embodiment consists of:

1. Metal I (MI) can be used from IIIB, IVB, VB, VIB, VIIB, VIIIB, and Metal II (MII) would be from VIIIB
2. The metal I and metal II ratio MI/MII could be in the range of 4 to 8 by weight
3. A different hydrophobic organic modifier that may contain functional group like alcohol, acid, amine etc. are used for surface modification.

Figure 2:
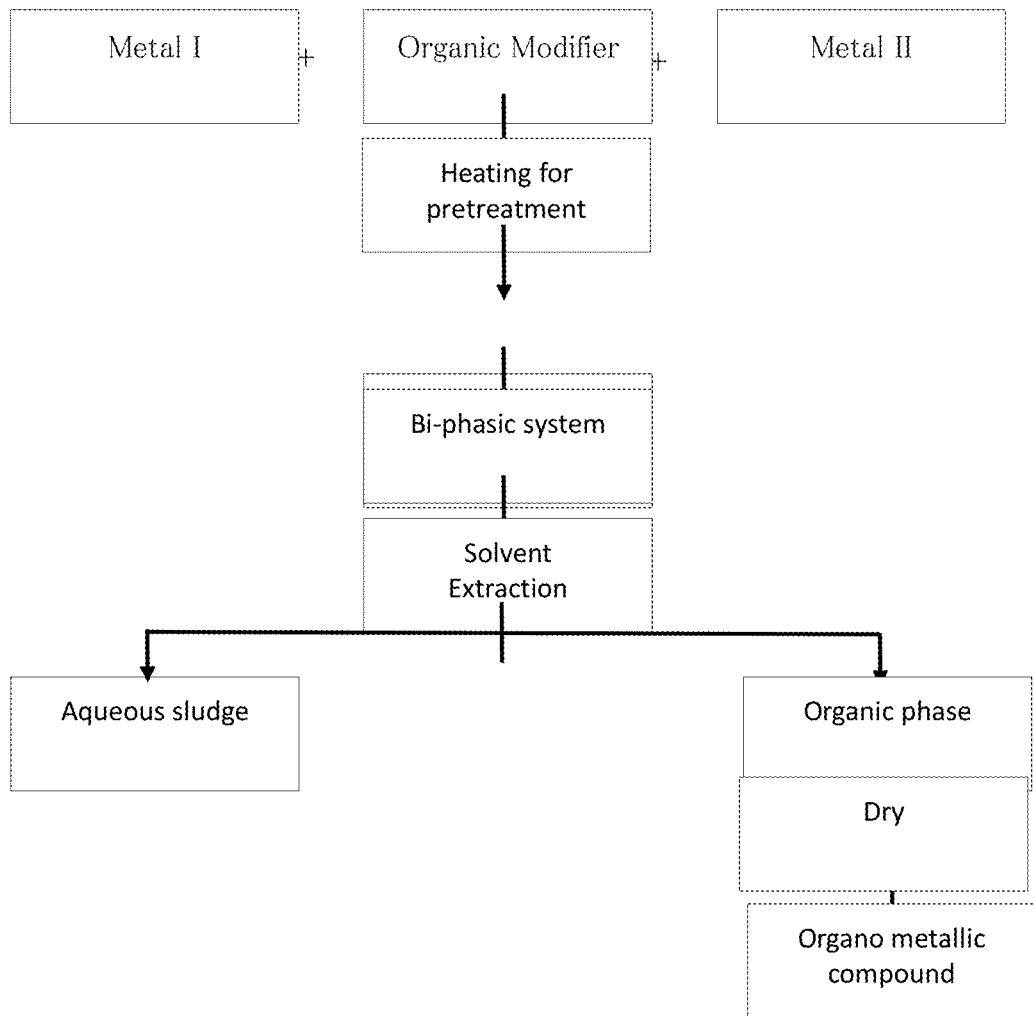
FIG. 2 depicts a flow diagram of preparation method for oil soluble catalyst

An aqueous metal solution of MI is prepared by taking 150 mL of water with 14.04 gram of tetrahydrade of ammonium hepta molybdate and another aqueous metal solution of MII is prepared by desolving of 5.14 gram of hexahydrade nickel nitrate. These two aqueous solutions is then mixed with an appropriate amount of modifier, oleic acid and then the reaction mixture is preheated at 200° C. for 30 minutes in high pressure of 125 kg/cm$^2$ in batch reactor and then the reaction mixture is treated at supercritical condition of around 380° C. and around 230 kg/cm$^2$ for around 40 minutes In this case the amount of oleic acid is taken in such a way that the final concentration of oleic acid is 4 molar with respect to MI in the mixture solution. At these conditions, water start behaves as non-polar solvents and the modifier is fused into the metal-inorganic framework in aqua-diffusive environment. After completion of supercritical reaction, the reaction mixture is quenched by chilled water at room temperature. The aqueous phase is then separated from organic phase where metals are fused. The organic phase is then washed with CH$_2$Cl$_2$ and dried. The prepared bimetallic-organic fused material is a solid catalyst which can easily be soluble in hydrocarbon or any organic solvents. In this particular case the solvent is decaline. The flow diagram of the catalyst preparation method is presented in FIG. 2.

Example 2

In the present invention residue hydro processing carried out using vacuum-residue as feedstock which has high metals, sulfur, and asphaltene contents. The properties of this feed are given in Table 1.

TABLE 1

Properties of the feed used for catalyst activity test

| Property | Value |
|---|---|
| Density @ 15° C. | 1.0554 |
| Kin. Viscosity@100° C., cSt | 25793 |
| Sulfur, wt % | 5.85 |
| CCR, wt % | 27 |
| C/H ratio (wt/wt) | 11 |
| Asphaltene, wt % | 19.5 |
| Ni, wppm | 65 |
| V, wppm | 240 |

One litre batch reactor was used for the catalyst activity test in this invention. An appropriate amount of the feedstock was taken into the reactor vessel and the amount of the feed is chosen 500 gram, preferably 300 gram and most preferably 200 gram. Around 5 gram of catalyst, preferably 4 gram and the most preferable 3 gram of catalyst is taken into the reactor. Since the catalyst itself contains the organic moiety, it is easily mix-up with the residue upon heating. At normal temperature the feedstock is in solid form. The preferred reaction temperature is 380° C., and the most preferred temperature is 410° C. Total reaction time fixed around 4 hrs. The preferred reaction pressure is 50 kg/cm$^2$ and the most preferred pressure is 100 kg/cm$^2$. The required amount of feed and catalyst were taken into the reactor. The reactor system was closed properly and leak test was performed. The reactor was then purged three times with pure hydrogen. The reactor was then pressured the adequate hydrogen so that the pressure should reach to the desired pressure at the given reaction temperature. When the temperature reached to the reaction temperature, the reaction mixture was stirred at 750 rpm. The reaction was continued around 4 hrs. After reaction the liquid product is separated from solid product (coke) and sulfur, metals and its distillation of liquid product were analyzed.

The conversions of HDM, HDS and HDAsp are calculated with the following equation:

% HDM or HDS conversion=(1−metals or sulfur or asphaltene in product/metals or sulfur or asphaltene in feed)×100

Similarly the residue hydrocracking conversion is given as:

% Hydrocracking conversion=(1−550° C.+material in product/550° C.+material in feed)×100

Where 550° C.+material in the product includes liquid, asphaltene and coke.

Figure 3:
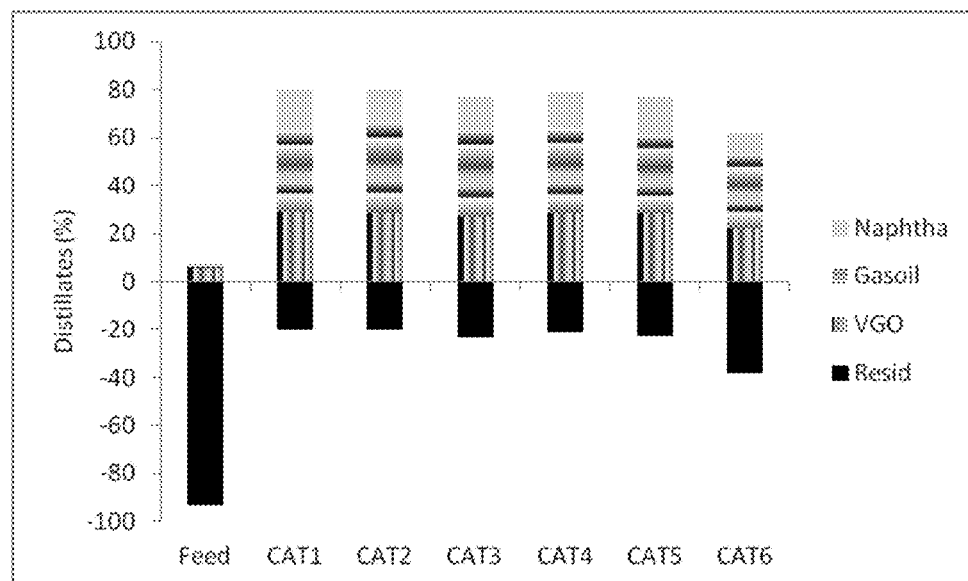
FIG. 3 depicts a curve showing residue hydrocracking conversion of different catalysts

The HDM, HDS and HDAsp conversions of this catalyst (CAT 1) is shown in Table 2 and hydrocracking activity is given in FIG. 3.

Example 3

The catalyst (CAT 2) of this particular example was prepared by similar procedure as described in example 1. This embodiment comprises a first hydrogenation metal selected from group VIB and the second metal selected from group VIIIB The ratio of Metal I and Metal II should be 0.8 to 1.5. In this particular case palmitic acid (5.03 g) was used as organic modifier. The organic phase was then washed by CHCl$_4$ and decaline was used as dispersion media. The catalytic activities of this case are carried out as a similar procedure as in example 1. The catalytic activities is given in Table 2 and hydrocracking activity is given in FIG. 3.

Example 4

In this particular case, the catalyst was synthesized by using lauric acid (9.00 g) as an organic modifier by keeping MI from VIB and MII from VIIIB reaction at supercritical condition similar to example 1. Diesel was used as dispersion media in this embodiment. Residue hydroprocessing activities were studied in similar conditions and same feed as mentioned in example 1. The activities of this catalyst (CAT 3) are presented in Table 2 and hydrocracking activity is given in FIG. 3.

Example 5

Cyclohexane carboxylic acid (5.00 g) was used for organic inorganic fused material to synthesize the residue hydroprocessing catalysts in this particular case. In this aqueous supercritical synthesis method, the ratio of Metal I and Metal is kept similar to example 1. The reaction conditions for catalyst synthesis were same as mentioned in example 1. In this case decaline was used as dispersed media. The catalytic activities were also studied and the reaction conditions are mentioned in example 1. Same feed was also used for its testing. The hydroprocessing activities of this catalyst (CAT 4) are given in Table 2 and hydrocracking activity is given in FIG. 3.

Example 6

The catalyst (CAT 5) of this particular example is prepared by similar procedure as described in example 1. This embodiment comprises hydrogenation metal selected from group VIB and VIIIB The ratio of Metal I and Metal II should be 0.8 to 1.2 and hexadecanol (4.00 g) was used as organic modifier. The catalyst synthesis was performed in presence of CHCl$_4$ and LCO as dispersion media. The catalytic activities of this case are carried out as a similar procedure as given in example 1. The catalytic activities are given in Table 2 and hydrocracking activity is given in FIG. 3.

Example 7

This embodiment is prepared by similar procedure as stated in example 1. The ratio of Metal I to Metal II is kept same as before. After supercritical reaction conditions the reaction is forced to quench as before told in previous example. Organic modification in this case was 2-methyl 1-hexanal (12 mL). Residue hydro processing activities of this catalyst (CAT 6) are given in Table 2 and hydrocracking activity is given in FIG. 3.

TABLE 2

Percentage of hydrodesulfurization, hydrodemetallization and asphaltene conversion of catalysts

|  | CAT1 | CAT2 | CAT3 | CAT4 | CAT5 | CAT6 |
|---|---|---|---|---|---|---|
| HDS, % | 61.33 | 61.92 | 60.88 | 62.21 | 60.26 | 62.19 |
| HDM, % | 78.89 | 83.25 | 87.44 | 83.93 | 83.69 | 92.87 |
| HDAsp, % | 81.6 | 84.51 | 84.67 | 85.38 | 84.46 | 84.26 |

The activities of the catalysts prepared by different organic modifiers have been in example 1 to 6. It is found from the above studies that the catalyst prepared by oleic acid modifier in example 1 shows the higher residue conversion. This embodiment is therefore chosen for further study and it is given below as example 8.

Example 8

Figure 4:
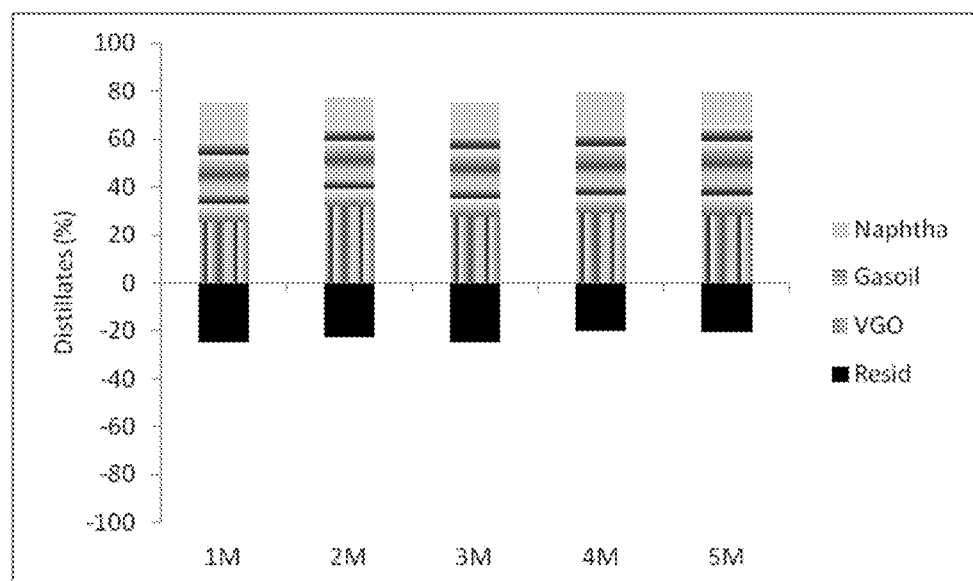
FIG. 4 depicts a curve showing residue hydrocracking conversion of different catalysts prepared by varying the concentration of Oleic acid.

The catalyst of this particular example is prepared by similar procedure as described in example 1. This embodiment comprises a first hydrogenation metal selected from group VIB and the second metal selected from group VIIIB The ratio of Metal I and Metal II is same as in example 1. In this case, the molar ratio of organic modifier with respect to MI is varied from 1 to 5. The oleic acid is taken as organic modifier. The catalytic activities of this case are carried out as a similar procedure as in example 1. The catalytic activities are shown in Table 3. The residue conversion of the catalysts prepared by the different oleic acid ratio (with respect to MI) is given in FIG. 4.

TABLE 3

Percentage of hydrodesulfurization, hydrodemetallization and asphaltene conversion of catalysts

|  | 1M | 2M | 3M | 4M | 5M |
|---|---|---|---|---|---|
| HDS, % | 63.51 | 61.51 | 60.82 | 61.33 | 61.67 |
| HDM, % | 83.0 | 73.6 | 75.25 | 78.9 | 78.13 |
| HDAsp, % | 88.51 | 87.03 | 82.67 | 81.6 | 86.36 |

Advantages of the Invention

Heavy oils and residues can be upgraded into more valuable products.
The catalysts prepared by this invention are thermally very stable and highly activity.
These catalysts are used in ppm level and easily soluble into the hydrocarbons.
The organic part and inorganic metals in these organometallic catalysts take part in solubility and reaction respectively.
The coke formation can be minimized by using suitable solvent with the catalyst.

We claim:

1. An organic-inorganic fused hybrid catalyst for use in a slurry phase reactor, consisting of an Inorganic part of one metal from group VIB and one metal from group VIIIB in a weight ratio of 4:1 and an organic part;
   wherein the metals are not in the form of metal oxides;
   wherein the organic part is provided on an inorganic part surface of the metals from group VIB and VIIIB; and
   wherein said hybrid catalyst is soluble in hydrocarbons.

2. The catalyst of claim 1, wherein the metal from VIB is molybdenum and the metal from VIIIB is nickel in a ratio of 4:1 and the said catalyst is solid at room temperature and is thermally stable.

3. The catalyst of claim 1 wherein the said catalyst is useful for hydroprocessing reaction selected from a group comprising of hydrodemetallization, hydrodesulfurization, asphaltene conversion and hydrocracking.

4. A process for the preparation of the slurry phase organic-inorganic fused hybrid catalyst of claim 1 comprising the steps of:
   a) mixing aqueous solutions of ammonium hepta molybdate and hexahydrade nickel nitrate to obtain a mixture;
   b) preheating the mixture of aqueous solutions of as obtained in step (a) with an organic modifier at a temperature in the range of 100-200° C. and at a pressure in the range of 75-150 kg/cm$^2$ for a period in the range of 10-30 minutes;
   c) reacting the mixture as obtained in step (b) in an autoclave batch reactor at a temperature in the range of 300-400° C., at a pressure in the range of 150-300 kg/cm$^2$ for a period in range of 30-75 minutes to obtain a reaction mixture;
   d) quenching the reaction mixture as obtained in step (c) at temperature in the range of 15-30° C. to obtain a bi-phase reaction mixture with an aqueous and organic phase; and
   e) separating the bi-phase reaction mixture as obtained in step (d) by solvent extraction, followed by washing and drying to obtain an organo metallic catalyst.

5. The process of claim 4, wherein the organic modifier of step (b) are added in 1M-5M ratio with respect to Mo.

6. The process of claim 4, wherein the organic modifier of step (b) is oleic acid, palmitic acid, lauric acid, cyclo hexane carboxylic acid, hexadecanol or 2-methyl 1-hexanal.

7. A method for hydro processing of heavy oils and residues (feedstock) using the catalyst of claim 1, comprising heating 100-500 gram of feedstock with 3-5 gram of catalyst in a reactor at a temperature in the range of 300-500° C., pressure in the range of 50-200 kg/cm$^2$ for a period in the range of 2-6 hours, stirring in the presence of hydrogen in a slurry phase reactor, and separating a desired product.

8. The method of claim 7, further comprising use of a solvent further defined as decaline, diesel, or light cyclic oil.

9. The method of claim 7, wherein the residue employed as feedstock comprises a high metal content of >250 wppm; a high sulfur content of >5 wt %; a high asphaltene content of >15 wt %; and contains a maximum 550° C. plus material as not less than 90 wt %.

* * * * *